United States Patent
Tiitola

[15] 3,653,453
[45] Apr. 4, 1972

[54] DEVICE FOR IMPROVING THE STEERABILITY OF A MOTOR SLED

[72] Inventor: Jussi Antti Tiitola, Takkulan Kartano, Lahti 3, Finland

[22] Filed: Mar. 31, 1970

[21] Appl. No.: 24,255

[30] Foreign Application Priority Data

Apr. 1, 1969 Finland.....................................948/69
Mar. 5, 1970 Finland.....................................609/70

[52] U.S. Cl..............................180/5 R, 180/9.52, 280/21 R
[51] Int. Cl...........................................................B62m 27/02
[58] Field of Search.................................180/5, 6, 4; 280/21

[56] References Cited

UNITED STATES PATENTS

| | | | |
|---|---|---|---|
| 3,504,752 | 4/1970 | Milward | 180/5 |
| 3,550,706 | 12/1970 | Watkins | 180/5 |
| 3,191,703 | 6/1965 | Romsdal | 180/5 |
| 2,749,189 | 6/1956 | France | 180/5 X |
| 1,696,125 | 12/1928 | Rantasa | 180/5 |

*Primary Examiner*—Richard J. Johnson
*Attorney*—John Lezdey

[57] ABSTRACT

A mechanical or hydraulic lifting device provided in a motor sled for improving its steerability, by means of which the relationship in height between the steering device, such as a ski element, and the traction surface or part of the traction surface of the propagation device, such as an endless track, is made variable during driving.

2 Claims, 5 Drawing Figures

Patented April 4, 1972 3,653,453

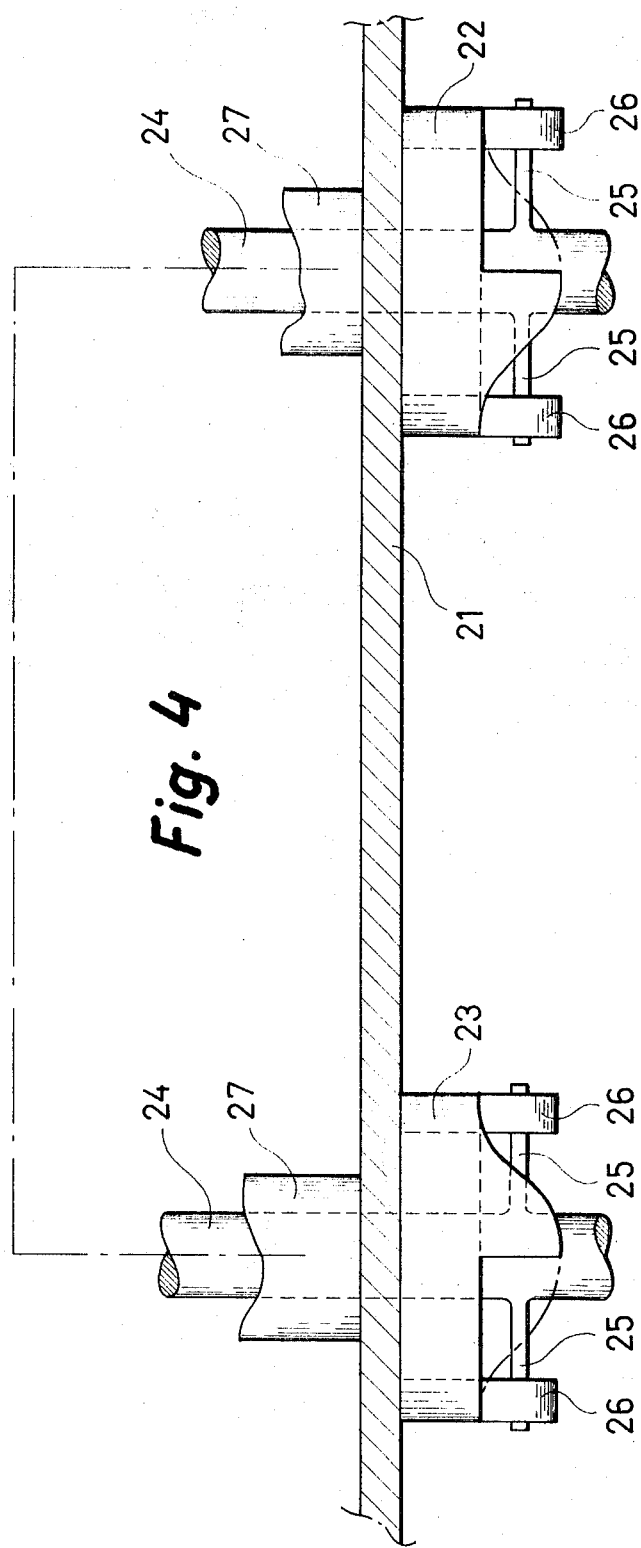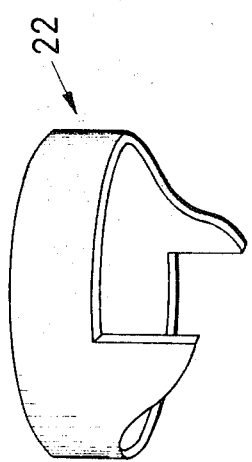

DEVICE FOR IMPROVING THE STEERABILITY OF A MOTOR SLED

BACKGROUND OF THE INVENTION

1. Field of the Invention

In recent time a vehicle has gained increased spread as a wintertime conveyance which has become known under the name of motor sled. The unit providing traction power for such motor sleds is usually an internal combustion engine, which drives one or two endless tracks, and as steering device one has as a rule employed one or two steering skis fitted in the forward part of the motor sled. The present invention concerns a device for improving the steerability of such a motor sled driving in varying or poor road conditions.

2. Brief Description of the Prior Art

A common characteristic of all motor sled types known at present which are steered by the aid of skis is their poor steerability when the road conditions are poor. In the case of certain motor sled types, steering is difficult or nearly uneffective on a hard snow crust, on ice or on ploughed roads, and the same is true for some other types in other road conditions such as in soft snow and particularly in wooded terrain.

In some types one has endeavored to improve the steerability by arranging the steering skis to be located at lower height with reference to the traction surface of the endless track. It is true that this has improved the steerability, but its consequence has been comparatively heavy so-called ploughing, which obviously increases the friction between the ski and the snow and increases the power consumption, and also impairs the traction of the track. These factors in combination reduce both the speed and traction capacity of the motor sled, and increase the fuel expense.

If the steering ski are arranged to be located at greater height with reference to the horizontal traction surface of the track, reduction of the friction between the skis and the snow or ice and improved traction capacity of the track and increased speed are achieved, but the steerability in terrain with comparatively hard driving surface and in wooded terrain, or otherwise on a winding route, is lowered even in fact to dangerously low level, which in its turn implies necessity of slow speed, assisting of steering with the foot, etc.

In different, variable conditions of driving surface and character of the route, the most favorable height of the skis with reference to the traction surface of the track cannot possibly be accomplished by means of any ski and track mounting methods belonging to prior art, as is evident from the foregoing.

SUMMARY OF THE INVENTION

In accordance with the present invention the steerability of a motor sled is improved so that the relationship in height between the steering device, such as a ski element, and the traction surface or part of the traction surface of the propagation device, such as a endless track, is variable during driving by means of various mechanical or hydraulic lifting devices previously known in themselves.

The ski element is raised or lowered with respect to the traction surface or the traction surface is raised or lowered with respect to the ski element. When turning the ski element in horisontal direction for steering the sled the lowering of the ski element may be performed at the same time. The ski on the side of the outer turn may be forceable to lower height than the ski on the side of the inner turn and said ski of the inner turn may additionally at the same time be forceable upwardly.

BRIEF DESCRIPTION OF THE DRAWINGS

In FIG. 4 a partial view of this device is presented, as viewed from behind, and FIG. 5 is a drawing in perspective of the part in FIG. 4.

DESCRIPTIONS OF THE PREFERRED EMBODIMENTS

Figure 1:
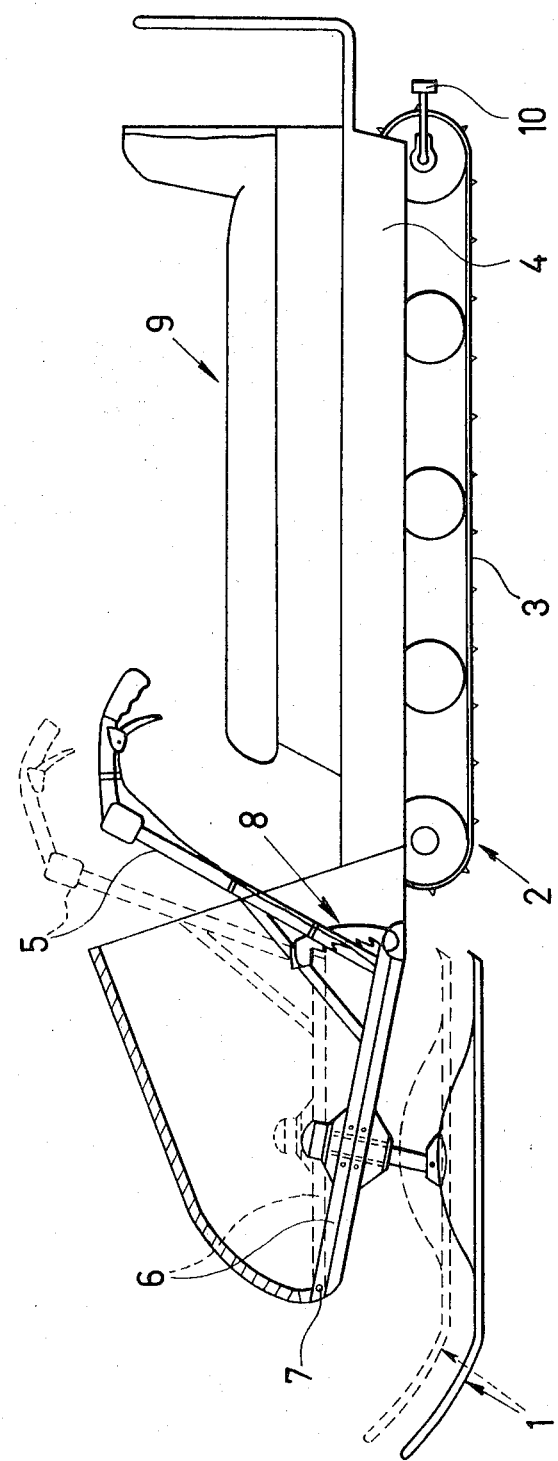
FIG. 1 shows a, partly sectioned, elevational view of a motor sled which has been improved in respect of its steerability according to the present invention.

In the embodiment presented in FIG. 1, the steering skis, or ski, 1 can be raised or lowered during driving with reference to the traction surface 3 of the track 2, by shifting the control rod 5 in a vertical plane running longitudinally with respect to the motor sled. Steering of the motor sled during driving is accomplished in normal manner by displacing the control rod 5 about a generally vertical axis in a horizontal plane.

The control rod 5 acts upon the ski 1 over a lever arm 6. The lever arm 6 has been arranged to be longitudinal with reference to the motor sled and to be turnable at its front end about an axis 7 placed horizontally in the front part of the sled. The steering ski 1 has been elastically attached to the lever arm 6 at a distance from the axis 7, and the control rod 5 has been connected to the lever arm 6 at its free rear end or close to it. The control rod 5 will be somewhat raised or lowered when it is turned in vertical direction, but this does not substantially impede the steering; it has been found that a shift in height of about 1–3 cm. of the skis 1 with reference to the traction surface 3 of the track 2 is sufficient for adequate improvement of steerability.

The lever arm 6 can be locked in its turning motion by means of a locking element 8 mounted on the sled body 4 and which is detachably engageable with the rear end of lever arm 6 to prevent the free swing of this end. In fact, the locking element 8 may be released even during driving, by means of the release handle 11 provided on the control rod 5, whereby it is then possible to improve the steerability of the sled without necessity to stop the sled.

In FIG. 1, furthermore, the seat of the motor sled has been indicated with the reference numeral 9 and the track tension adjustment device placed at the rear end of the endless track, with reference numeral 10.

Figure 2:
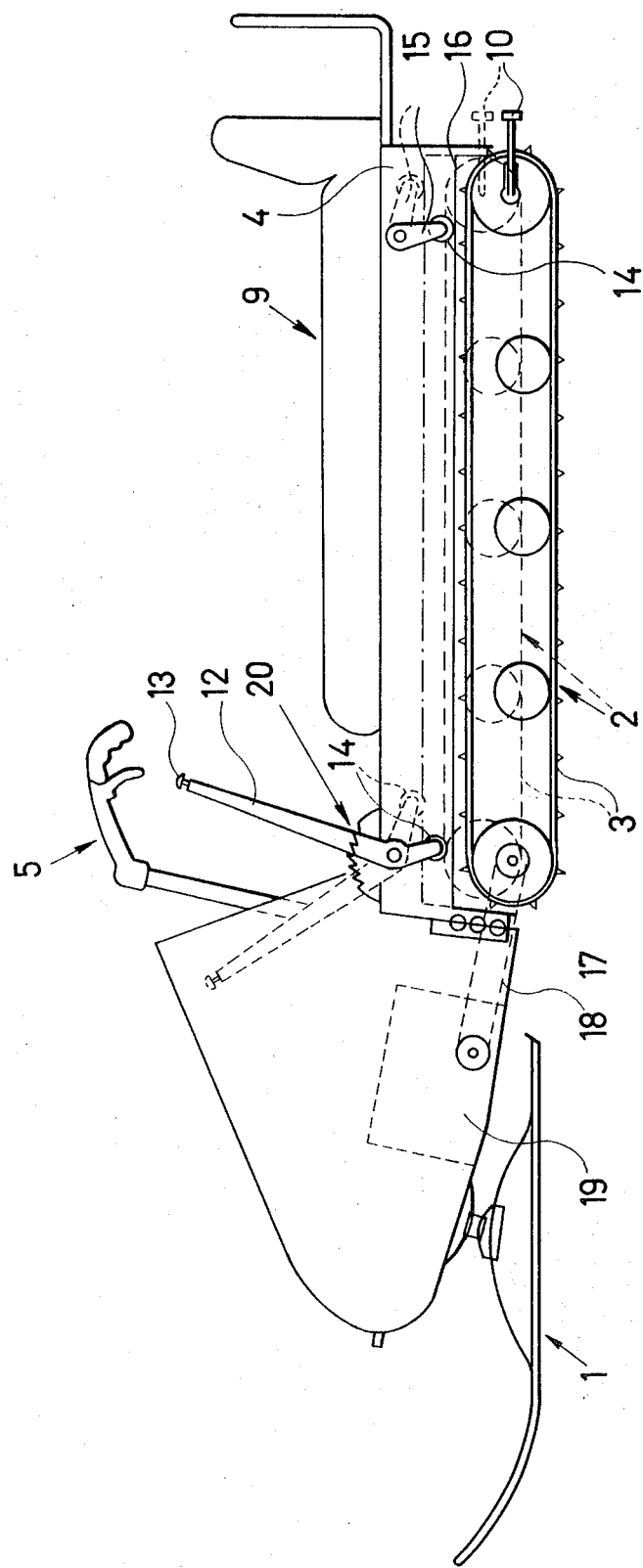
FIG. 2 is a similar view as that in FIG. 1 presenting another, alternative embodiment.

In the embodiment shown in FIG. 2, the steering ski 1 is stationary, while the endless track 2 is raisable and lowerable for adjustment of the height with reference to each other of the track's traction surface 3 and the steering ski 1.

The track raising device comprises the lifting lever 12, the lifting lever locking element 20 with its release button 13, the roll 14 mounted on the lower end of the lifting lever, and three liftings arms 15 with rolls 14, which cooperate with lifting lever.

The lifting lever has been placed beside the driver, on one side of the motor sled, and it has been arranged to be turnable about a horizontal, transversal axis projecting from the sled body 4. Under this pivotal axis, at the lower end of the lifting lever, the roll 14 has been mounted, which has been fitted against the upper surface 16 of the periphery of the endless track 2. The lower end of lifting lever 12 cooperates with the lifting arm 15, which is turnably fitted in the rear part of the body 4 and the upper end of which turns about a horizontal transversal axis mounted in the body 4, and which has at its lower end a roll 14 resting against the upper surface of the periphery 16 in its rear portion. On the opposite side of the body there are two further lifting arms, which cooperate with the lifting lever 12 and lifting arm 15 for raising and lowering the endless track.

The lifting arm 12 is lockable in any given position with the aid of a locking element 20, which in this case is a disk with teeth on its upper surface, between the teeth of which a pin protruding from the lifting lever, or equivalent, can be inserted and, respectively, released with the aid of the locking element release button 13.

In FIG. 2, the engine of the sled has been indicated with reference numeral 19, the transmission chain with 18, and the chain tension rolls, with 17.

It is not absolutely necessary to raise or lower the track in its entirety: it suffices to raise or lower the front part of the track or, advantageously, its rear part, in which instance the front part is fixedly mounted or mounted on springs.

In an alternative embodiment, the steering ski or skis have been arranged to be raisable and lowerable by turning the ski or skis in the horizontal plane. When the motor sled proceeds in a straight line, the steering skis are at normal height at which their friction against snow or ice is small, but when the sled is turned e.g., by turning the steering or control rod, the steering skis, or preferably only the steering ski on the far side of the turn, will at the same time be displaced downwardly, whereby the steerability immediately improves. The greater the amount by which the ski is turned, the greater is the regulatory displacement of the ski in height. A device for accomplishing an effect of this kind is presented in FIGS. 3 to 5.

Figure 3:
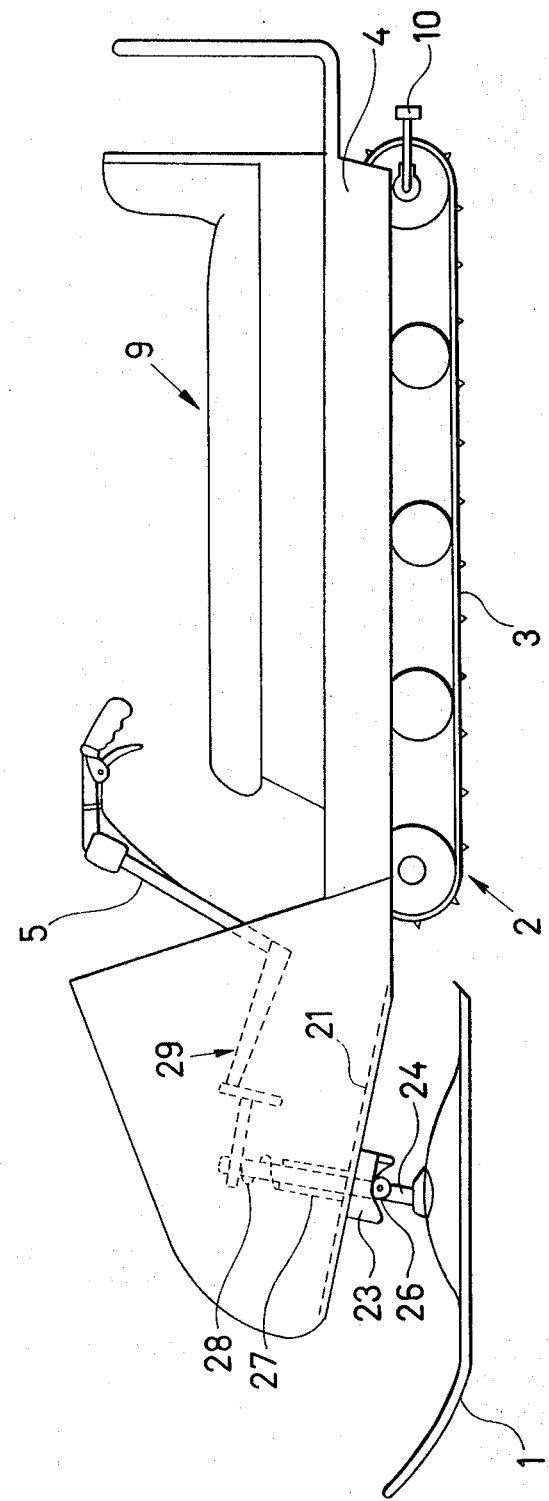
FIG. 3 is a partly sectioned elevational view of a motor sled, displaying an ancillary device for improvement of steerability.

In FIG. 3, the reference numeral 1 indicates the left steering ski, 2 the endless track, 3 the traction surface of the track, 4 the body of the motor sled, 5 the control rod, and 9 the seat of the motor sled. The tension device for the track, which has been mounted at the rear end of the track 2, has been indicated by reference numeral 10.

By turning the control rod 5 e.g., to the left, both governor cam pins 24 (in FIG. 4) are made to turn in the horizontal plane leftwardly by mediation of the lever 29. The governor cam pins 24 pass through the bottom of the motor sled body, 21, and are at their lower ends attached to the skis 1 by mediation of the ski spring, and they may move axially independent of each other. The governor cam pins 24 have furthermore been passed through two sleeves 27 fixed to the bottom 21 of the motor sled body, a spiral spring having been placed between the annular upper face of sleeves 27 and the point of attachment of lever 29, whereby the governor cam pins 24 are urged upwardly.

On the lower side of the body bottom 21, around the governor cam pins, sleeves 23 and 22 have been fixed, of the lower rims of which two alternating fourths are wavy, and substantially level, so that the sleeve 22 is the mirror image of sleeve 23. The sleeves 22 and 23 rest on their lower rims upon rolls 26, the shafts 25 of which project opposite to each other on both sides of the governor cam pins 24.

When the governor cam pins 24 in FIG. 4 turn in the horizontal plane towards the left, the rolls 26 of the left governor cam pin 24 will run along a substantially horizontal track, that is the left governor cam pin 24 will in the course of turning retain unchanged height in relation to the traction surface 3 of the track 2. At the same time, however, the right governor cam pin 24 will be pushed downwardly because its rolls 26 travel along the curved lower edge of sleeve 22, as is clearly seen from FIG. 5.

In connection of a right-hand turn, again, the left governor cam pin will forced in downwardly direction, while the height relationship of the right-hand governor cam pin remains unchanged. In this manner the ski which is farthest away from the center about which the sled turns is forced downwardly, whereby the steering is substantially improved.

The steerability may also be improved by providing on the governor cam pins screw threads and, on the body, corresponding sleeves with mating thread so that, for instance at a left turn the left ski will be lifted while simultaneously the right ski is urged downwardly, and vice versa.

It is also possible to improve the steerability by means of ball joint levers associated with the levers controlling the governor cam pins, which at straight running are in oblique position but are turned into straight position when a turn is executed, thus forcing the governor cam pin downwardly which corresponds to the outer side of the curve.

Height adjustment of the governor cam pins may also be accomplished by hydraulic means in that to the control rod lever two power cylinders are connected, which on a twist of the steering mechanism raise or lower one ski or the other by the aid of power cylinders located at the upper end of the governor cam pins. Pneumatically, this is accomplished with the aid of the vacuum in the crank case of the engine by using so-called vacuum pillows fitted to the upper ends of the cam pins. Adjustment is by means of a valve on the control rod.

It is also obvious that the said hydraulic or pneumatic equipment may be furthermore arranged appropriately to control with the aid of a setting independent of the steering, the combined relationship in height of both steering skis with reference to the traction surface of the track. Thereby, at the same time, an alternative embodiment for the devices presented in FIGS. 1 and 2 is obtained.

In the embodiment displayed in FIG. 1 it is also possible to use a separate lifting lever for turning the lever arm and for raising and lowering the steering ski.

It is also to be noted that the invention is not confined to any given type of steering or traction device nor to any given number of such devices. The lifting device arrangements shown in the attached drawings, too, have merely been presented in illustration of the invention, not in confinement of the same. It is also obvious that such devices are covered by the invention in which both the ski element and the traction surface of the endless track is raisable or lowerable.

What is claimed is:

1. In a motor sled a device for adjusting the height position of the steering device, such as a ski element, in relation to the traction surface of propagation device, such as an endless track, in order to improve steerability of the motor sled, comprising a control rod for raising and lowering said steering device, said control rod being rotatable about a generally vertical axis in a horizontal plane to steer said vehicle, a lever arm placed substantially longitudinally with reference to the motor sled, the front end of said lever arm being turnable about a horizontal axis provided transversely in the front part of said motor sled, said steering device being fixed to said lever arm at a distance from the turnably pivoted front end of said lever arm, the rear end of said lever arm being fixed to said control rod for movement therewith and to a locking element for locking the free end of said lever arm.

2. The motor sled of claim 1 wherein the steering device comprises a pair of skis.

* * * * *